(12) United States Patent
Allam

(10) Patent No.: US 9,914,643 B2
(45) Date of Patent: Mar. 13, 2018

(54) INCREMENTAL HYDROGEN PRODUCTION FROM AN EXISTING STEAM/NATURAL GAS REFORMER

(71) Applicant: GTLPETROL HOLDING CO. LLC, Manhattan, KS (US)

(72) Inventor: Rodney J. Allam, Chippenham (GB)

(73) Assignee: GTLpetrol Holding Co. LLC, Manhattan, KS (US)

( * ) Notice: Subject to any disclaimer, the term of this patent is extended or adjusted under 35 U.S.C. 154(b) by 0 days.

(21) Appl. No.: 15/155,715

(22) Filed: May 16, 2016

(65) Prior Publication Data

US 2017/0101313 A1 Apr. 13, 2017

Related U.S. Application Data

(60) Provisional application No. 62/162,229, filed on May 15, 2015.

(51) Int. Cl.
*C01B 3/56* (2006.01)
*B01D 53/047* (2006.01)
*B01D 53/00* (2006.01)

(52) U.S. Cl.
CPC .............. *C01B 3/56* (2013.01); *B01D 53/002* (2013.01); *B01D 53/047* (2013.01);
(Continued)

(58) Field of Classification Search
CPC ................ B01D 53/002; B01D 53/047; B01D 2257/108; B01D 2257/504;
(Continued)

(56) References Cited

U.S. PATENT DOCUMENTS 6,551,380 B1 * 4/2003 Reddy ................ B01D 53/1437
95/116
2009/0211442 A1 * 8/2009 Allam ...................... C01B 3/36
95/96
(Continued)

FOREIGN PATENT DOCUMENTS

WO 0027505 A1 5/2000
WO 2010022162 A2 2/2010
(Continued)

OTHER PUBLICATIONS

International Search Report and Written Opinion issued in International Application No. PCT/US2016/032716, dated Jul. 15, 2016, 11 pages.

*Primary Examiner* — Frank Lawrence
(74) *Attorney, Agent, or Firm* — Fish & Richardson P.C.

(57) ABSTRACT

In some aspects, a method for incremental hydrogen production includes separating in a first Pressure Swing Absorption (PSA) system an existing reformer synthesis gas product stream into a first hydrogen stream and a first waste stream. The first waste stream is compressed to at least 40 bar to produce a compressed waste stream. Water is removed from the compressed waste stream to produce a dried waste stream. Carbon dioxide is removed from the dried waste stream to produce a remaining waste stream, and the removed carbon dioxide is at least 85% of carbon dioxide in the existing reformer synthesis gas product stream. A second PSA system separates the remaining waste stream into a second hydrogen stream and a second waste stream, and the second hydrogen stream comprises at least 11% of hydrogen from the existing reformer synthesis gas product stream.

2 Claims, 1 Drawing Sheet

ADDITIONAL EQUIPMENT ADDED TO AN EXISTING STEAM/NAT GAS REFORMER INCREASES H2 PRODUCTION BY 11%

CAPTURES 90% OF $CO_2$ FROM EXISING PSA GAS FEED GAS

(52) U.S. Cl.
CPC .. *B01D 2257/108* (2013.01); *B01D 2257/504* (2013.01); *B01D 2257/80* (2013.01); *C01B 2203/0205* (2013.01); *C01B 2203/042* (2013.01); *C01B 2203/0475* (2013.01); *C01B 2203/0495* (2013.01); *C01B 2203/147* (2013.01)

(58) Field of Classification Search
CPC .......... B01D 2257/80; C01B 3/56; C01B 2203/0205; C01B 2203/042; C01B 2203/0475; C01B 2203/0495; C01B 2203/147
USPC ............. 95/96, 139; 96/121, 131, 132, 134; 62/617
See application file for complete search history.

(56) References Cited

U.S. PATENT DOCUMENTS

| | | | | |
|---|---|---|---|---|
| 2010/0287981 A1* | 11/2010 | Chen | ............ | C01B 3/384 62/619 |
| 2010/0288123 A1* | 11/2010 | Chen | ............ | C01B 3/384 95/93 |
| 2012/0141368 A1 | 6/2012 | Vakil et al. | | |

FOREIGN PATENT DOCUMENTS

| | | | |
|---|---|---|---|
| WO | 2011067326 A1 | 6/2011 | |
| WO | WO2016187125 A1 | 11/2016 | |

\* cited by examiner

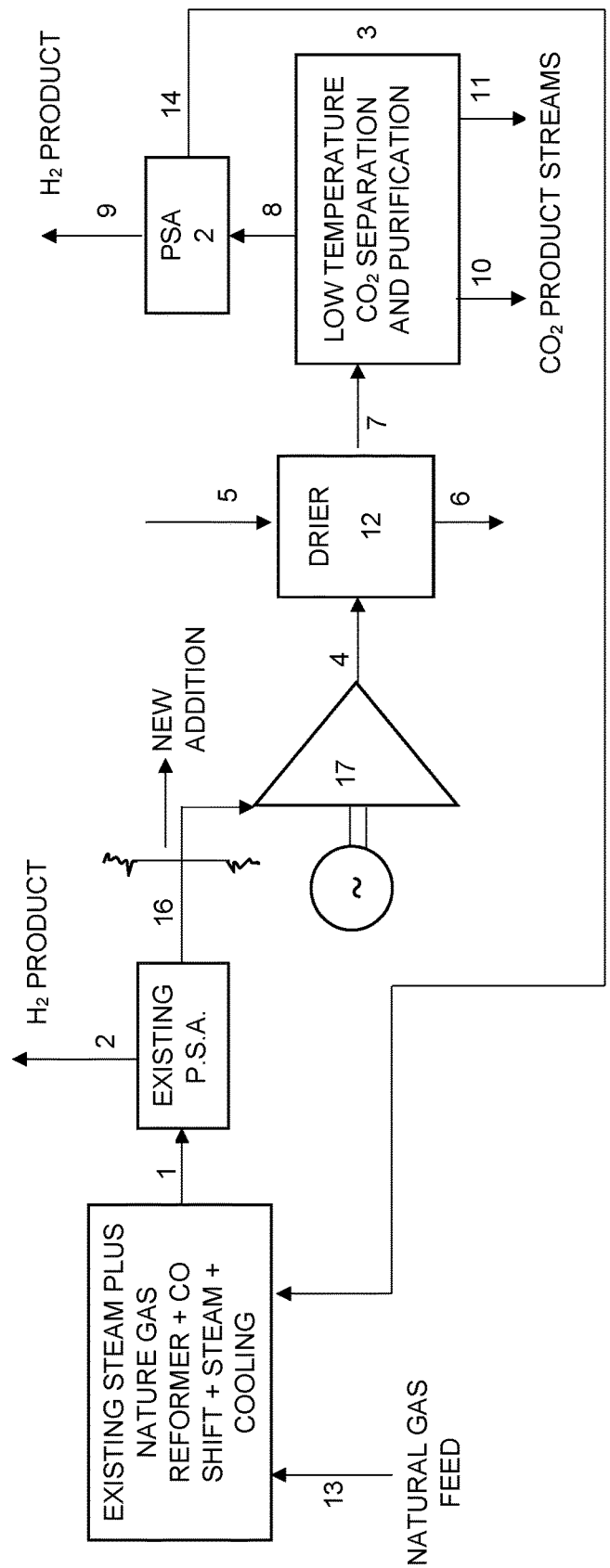

INCREMENTAL HYDROGEN PRODUCTION FROM AN EXISTING STEAM/NATURAL GAS REFORMER

TECHNICAL FIELD

This invention relates to gas-to-liquids production, and more particularly to incremental hydrogen production from an existing steam/natural gas reformer.

BACKGROUND

An integrated plant for the conversion of a hydrocarbon gas such as natural gas to useful hydrocarbon liquid fuels and feed-stocks comprises an H2+CO syn-gas generation system which provides feed gas to a Fischer-Tropsch catalytic hydrocarbon synthesis system with an associated power and heat energy system.

High efficiency, low capital cost, together with a low carbon footprint, are the major objectives of a total facility. U.S. Pat. Nos. 6,534,551 and 6,669,744 describe an integrated synthesis gas generation system comprising a two-stage synthesis gas generation unit integrated with a gas turbine which provides at least part of the energy required to drive an O2 production plant. The O2 plant can be either a cryogenic air separation unit, a high temperature mixed oxide O2 ion transfer membrane reactor integrated with the gas turbine, or other unit. The two stage synthesis gas generator comprises a Partial Oxidation (PDX) or an Autothermal Reformer (ATR) coupled in either case in a parallel or series configuration with a gas heated catalytic steam/hydrocarbon reformer (GHR) in which the heating gas is the mixed product from each synthesis gas generation reactor. The hot exhaust gas from the gas turbine provides at least part of the heat used to preheat the feed streams to the synthesis gas generation reactors.

DESCRIPTION OF DRAWINGS

FIG. 1 is an example system for incremental hydrogen production.

Like reference symbols in the various drawings indicate like elements.

DETAILED DESCRIPTION

FIG. 1 illustrates an example system for incremental hydrogen production. For example, the process for incremental hydrogen production from an existing catalytic steam/natural gas reformer may use a low-temperature $CO_2$ condensation process to separate the $CO_2$ present in the waste gas from an existing reformer pressure swing adsorption (PSA) hydrogen separation unit so that the remaining hydrogen enriched waste gas may then be sent to a second PSA unit where more $H_2$ can be separated. The waste gas stream 16 may initially be compressed from, for example, about 1.2 bar to 40 bar in the compressor 17 and then the compressed waste gas stream 4 is dried in, for example, an adsorbent bed drier 12, which is regenerated by a nitrogen gas stream 5 and 6. As illustrated, the compressed waste gas steam 7 enters the $CO_2$ condensation system 3 where it is cooled to, for example, within 2° C. of its triple point temperature. The liquid $CO_2$ is separated and evaporated to produce refrigeration for the process and the $CO_2$ product leaves as two separate streams 10 and 11 at an average pressure of about 10 bar. The remaining compressed waste gas, stream 8, containing about 65% $H_2$, is separated in the PSA 2 producing a substantially pure $H_2$ stream 9 at 35 bar pressure and a waste gas stream 14 which is used as part of the fuel gas in the existing reformer furnace. In some implementations, the system described can produce an incremental 11% more $H_2$ from the existing reformer synthesis gas product stream 1. The incremental $H_2$ production may use additional natural gas to replace the $H_2$ which would have been burned in the reformer furnace. The fuel consumption for the incremental $H_2$ production is, in some implementations, 280 Btu/scf $H_2$. In these instances, the produced $CO_2$ in streams 10 plus 11 can be about 85% of the $CO_2$ present in the reformer product stream 1.

A number of embodiments of the invention have been described. Nevertheless, it will be understood that various modifications may be made without departing from the spirit and scope of the invention. Accordingly, other embodiments are within the scope of the following claims.

What is claimed is:

1. A method for incremental hydrogen production, comprising:
   separating in a first Pressure Swing Absorption (PSA) system an existing reformer synthesis gas product stream into a first hydrogen stream and a first waste stream;
   compressing the first waste stream to at least 40 bar to produce a compressed waste stream;
   removing water from the compressed waste stream to produce a dried waste stream;
   removing carbon dioxide from the dried waste stream to produce a remaining waste stream, wherein the removed carbon dioxide is at least 85% of carbon dioxide in the existing reformer synthesis gas product stream;
   separating in a second PSA system the remaining waste stream into a second hydrogen stream and a second waste stream, wherein the second hydrogen stream comprises at least 11% of hydrogen from the existing reformer synthesis gas product stream; and
   passing the second waste stream to a reformer furnace as fuel gas.

2. A system for incremental hydrogen production, comprising:
   a first Pressure Swing Absorption (PSA) system configured to separate an existing reformer synthesis gas product stream into a first hydrogen stream and a first waste stream;
   a compressor configured to compress the first waste stream to at least 40 bar to produce a compressed waste stream;
   a drier configured to remove water from the compressed waste stream to produce a dried waste stream;
   a low-temperature separator configured to remove carbon dioxide from the dried waste stream to produce a remaining waste stream, wherein the removed carbon dioxide is at least 85% of carbon dioxide in the existing reformer synthesis gas product stream;
   a second PSA system configured to separate the remaining waste stream into a second hydrogen stream and a second waste stream, wherein the second hydrogen stream comprises at least 11% of hydrogen from the existing reformer synthesis gas product stream; and
   a conduit configured to pass the second waste stream to a reformer furnace as fuel gas.

* * * * *